United States Patent
Mitchell

(10) Patent No.: US 9,139,139 B2
(45) Date of Patent: Sep. 22, 2015

(54) CONSOLE

(75) Inventor: Ciaran Mitchell, Byfleet (GB)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 0 days.

(21) Appl. No.: 13/358,057

(22) Filed: Jan. 25, 2012

(65) Prior Publication Data
US 2012/0127643 A1     May 24, 2012

Related U.S. Application Data

(63) Continuation of application No. 12/160,171, filed as application No. PCT/GB2007/001566 on Apr. 27, 2007, now Pat. No. 8,109,569.

(51) Int. Cl.
| | | |
|---|---|---|
| *A47C 31/00* | (2006.01) | |
| *B60R 11/02* | (2006.01) | |
| *B60N 2/44* | (2006.01) | |

(52) U.S. Cl.
CPC ..... *B60R 11/0235* (2013.01); *B60N 2002/4405* (2013.01); *Y10T 29/49826* (2015.01)

(58) Field of Classification Search
CPC .................. A47C 7/72; B60N 2/4876; B60N 2002/4405; B60R 11/0235; Y10T 29/49826
USPC .............................. 297/217.1, 217.3, 391, 410
See application file for complete search history.

(56) References Cited

U.S. PATENT DOCUMENTS

| | | | |
|---|---|---|---|
| 5,179,447 A | 1/1993 | Lain | |
| 5,398,991 A | 3/1995 | Smith et al. | |
| 5,600,580 A | 2/1997 | Honjo et al. | |
| 6,048,222 A | 4/2000 | Price | |
| 6,315,585 B1 | 11/2001 | Oka | |
| 6,517,372 B1 | 2/2003 | Jones | |
| 6,698,832 B2* | 3/2004 | Boudinot | 297/217.4 |
| 6,702,604 B1 | 3/2004 | Moscovitch | |
| 6,851,958 B1 | 2/2005 | Rowland et al. | |
| 7,070,237 B2* | 7/2006 | Rochel | 297/217.3 |

(Continued)

FOREIGN PATENT DOCUMENTS

| | | |
|---|---|---|
| DE | 19943696 | 3/2001 |
| EP | 1666307 A1 | 6/2006 |

(Continued)

OTHER PUBLICATIONS

Search Report dated Aug. 3, 2006 for Application No. GB0609240.7.
Search Report for GB1121523.3 dated Apr. 11, 2012.
Search Report dated Jun. 10, 2008 for Application No. GB0803134.6.

*Primary Examiner* — Philip Gabler
(74) *Attorney, Agent, or Firm* — F. Chau & Associates, LLC

(57) ABSTRACT

A vehicle passenger is provided with a console for mounting an entertainment apparatus, the console being coupled to the back of a more forwardly located seat by headrest retaining clips of the kind adapted to hold posts of a height adjustable headrest for the seat at a height selected position. In one arrangement, the console is sandwiched between the headrest retaining clips and the top of the seat back. In an alternative arrangement, the console incorporates integral headrest retaining clips that replace the conventional headrest retaining clips.

14 Claims, 13 Drawing Sheets

(56) References Cited

U.S. PATENT DOCUMENTS

| | | |
|---|---|---|
| 2003/0025367 A1 | 2/2003 | Boudinot |
| 2003/0057339 A1 | 3/2003 | Watkins |
| 2004/0032541 A1* | 2/2004 | Rochel .......................... 348/825 |
| 2004/0113479 A1 | 6/2004 | Jost |
| 2004/0160096 A1* | 8/2004 | Boudinot .................... 297/217.3 |
| 2005/0116943 A1* | 6/2005 | Wohrle et al. ................. 345/211 |
| 2005/0200185 A1 | 9/2005 | Yokoyama et al. |
| 2006/0032996 A1* | 2/2006 | Wu ............................ 248/218.4 |
| 2006/0087163 A1 | 4/2006 | Cilluffo et al. |
| 2006/0119151 A1 | 6/2006 | Vitito |

FOREIGN PATENT DOCUMENTS

| | | |
|---|---|---|
| JP | 03-128007 | 5/1991 |
| JP | 2003299549 | 10/2003 |
| JP | 2004042689 | 2/2004 |
| JP | 2005067563 | 3/2005 |
| WO | 2006/107521 A2 | 10/2006 |
| WO | 2006-138446 | 12/2006 |
| WO | 2011/101083 A1 | 8/2011 |

* cited by examiner

CONSOLE

CROSS-REFERENCE TO RELATED APPLICATIONS

This application is a Continuation of U.S. patent application Ser. No. 12/160,171, filed on Nov. 24, 2008, now U.S. Pat. No. 8,109,569 which claims priority to International Application Number PCT/GB2007/001566, filed on Apr. 27, 2007. The disclosures of which are incorporated by reference herein in their entireties.

BACKGROUND

This disclosure relates to the provision of entertainment for rear seat passengers in a vehicle.

There have been numerous prior proposals for mounting audio/visual apparatus in or from the back of, or between, the front seats of a vehicle so that passengers in the rear seats may listen to, watch, or interact with such equipment.

Provision of such equipment fitted into the back of the front seats or mounted in the roof generally requires fitting as original equipment. Moreover, the equipment is immediately visible from outside the vehicle, inviting breaking, entering, damage and theft.

With a view to overcoming these problems there have also been a number of suggestions to hang audio/visual apparatus over the top of the front seat or from the front seat headrest or headrest posts by means of straps, brackets or clamps. With many such arrangements, the audio/visual equipment is either not mounted in a stable position or, if clamped or otherwise fitted to the headrest posts, gets in the way of or moves with the headrest posts as the headrest is raised or lowered. The audio/visual equipment itself or its hanging or fixings are usually readily visible from outside the vehicle, again attracting breaking, entering, damage and theft when the vehicle is left unattended.

SUMMARY

The present disclosure is concerned with a novel approach to the mounting of audio/visual entertainment equipment. Preferred embodiments have the advantage not only that the equipment is stably mounted, but also allow the apparatus to be readily detached from a relatively inconspicuous console to be carried away from the vehicle by the passengers when the vehicle has been parked or to be stored within a lockable compartment within the vehicle when the vehicle is stationary so as not to be visible from outside the vehicle. The fixing system does not interfere with normal raising or lowering of the headrest.

According to a first aspect of the present disclosure, a method is provided for mounting a console, the console being adapted for mounting entertainment apparatus thereto for use by a vehicle passenger seated behind a more forward seat of the vehicle which seat is fitted with a height adjustable headrest mounted on posts receivable in sockets formed in a top surface of the said seat and associated with respective headrest retaining clips receivable in the respective said sockets and adapted to lock the said posts in the said sockets when the height of the headrest has been selected; the method comprising providing the console with a pair of openings through which the said posts may extend and sandwiching the console between the top surface of the said seat and portions of the said headrest retaining clips.

According to an alternative aspect of this disclosure, apparatus is provided comprising a console adapted for mounting entertainment apparatus for use by a vehicle passenger seated behind a more forward seat of the vehicle which seat is fitted with a height adjustable headrest of the kind mounted on posts receivable in sockets formed in a top surface of a said seat and associated with respective individual headrest retaining clips receivable in the respective said sockets and adapted to lock the said posts in the said sockets when the height of the headrest has been selected; the console having a pair of openings through which the said posts may extend, and the console incorporating respective headrest retaining clips integral with the console and receivable in the respective said sockets in place of said individual headrest retaining clips and being adapted both to lock the said posts within the said sockets and to lock the console in position.

In a third alternative aspect of this disclosure, there is provided apparatus comprising a vehicle seat provided with a console mounting entertainment apparatus for use by a vehicle passenger seated behind the said seat, the said seat being fitted with a height adjustable headrest mounted on posts receivable in sockets formed in a top surface of the said seat and associated with respective headrest retaining clips receivable in the respective said sockets and adapted to lock the said posts in the said sockets when the height of the headrest has been selected; the console being provided with a pair of openings through which the said posts may extend and being sandwiched between the top surface of the said seat and portions of the said headrest retaining clips.

According to a fourth alternative aspect of this disclosure, apparatus is provided comprising a vehicle seat provided with a console mounting entertainment apparatus for use by a vehicle passenger seated behind the said seat, the said seat being fitted with a height adjustable headrest of the kind mounted on posts receivable in sockets formed in a top surface of a said seat and associated with respective individual headrest retaining clips receivable in the respective said sockets and adapted to lock the said posts in the said sockets when the height of the headrest has been selected; the console having a pair of openings through which the said posts extend, and the console incorporating respective headrest retaining clips integral with the console and receivable in the respective said sockets in place of said individual headrest retaining clips and being adapted both to lock the said posts within the said sockets and to lock the console in position.

In accordance with a fifth alternative aspect of this disclosure, there is provided a vehicle in which a rear passenger, namely a passenger seated in a seat confronting the back of a more forwardly located seat, is provided with a console for mounting an entertainment apparatus, the console being coupled to the back of said more forwardly located seat by headrest retaining clips of the kind adapted to hold posts of a height adjustable headrest for said seat at a height selected position.

In all of these alternative arrangements, the headrest is still capable of being raised and lowered in conventional fashion by releasing the headrest retaining clips and moving the posts up or down.

BRIEF DESCRIPTION OF THE DRAWINGS

A number of embodiments are described in more detail hereinbelow with reference to the accompanying drawings, in which:—

Figure 1:
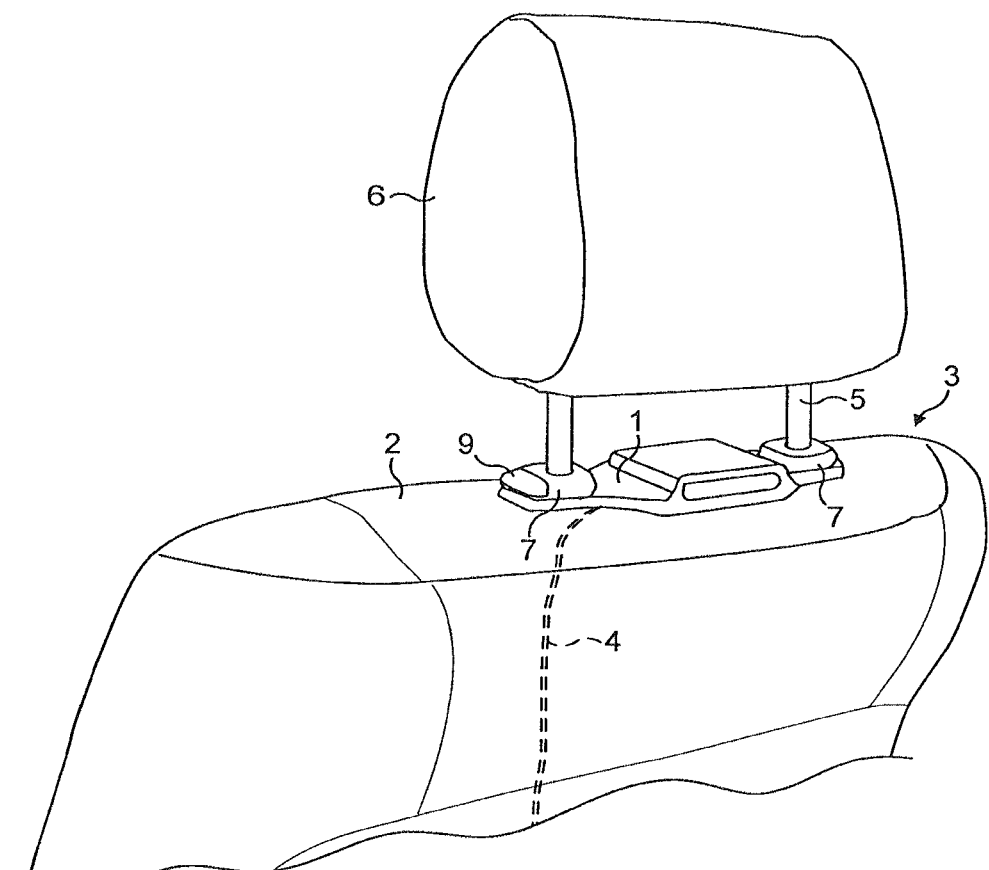
FIG. 1 is a perspective view showing a first embodiment of console for an audio/visual apparatus mounted in position on a vehicle seat back.
Figure 2:
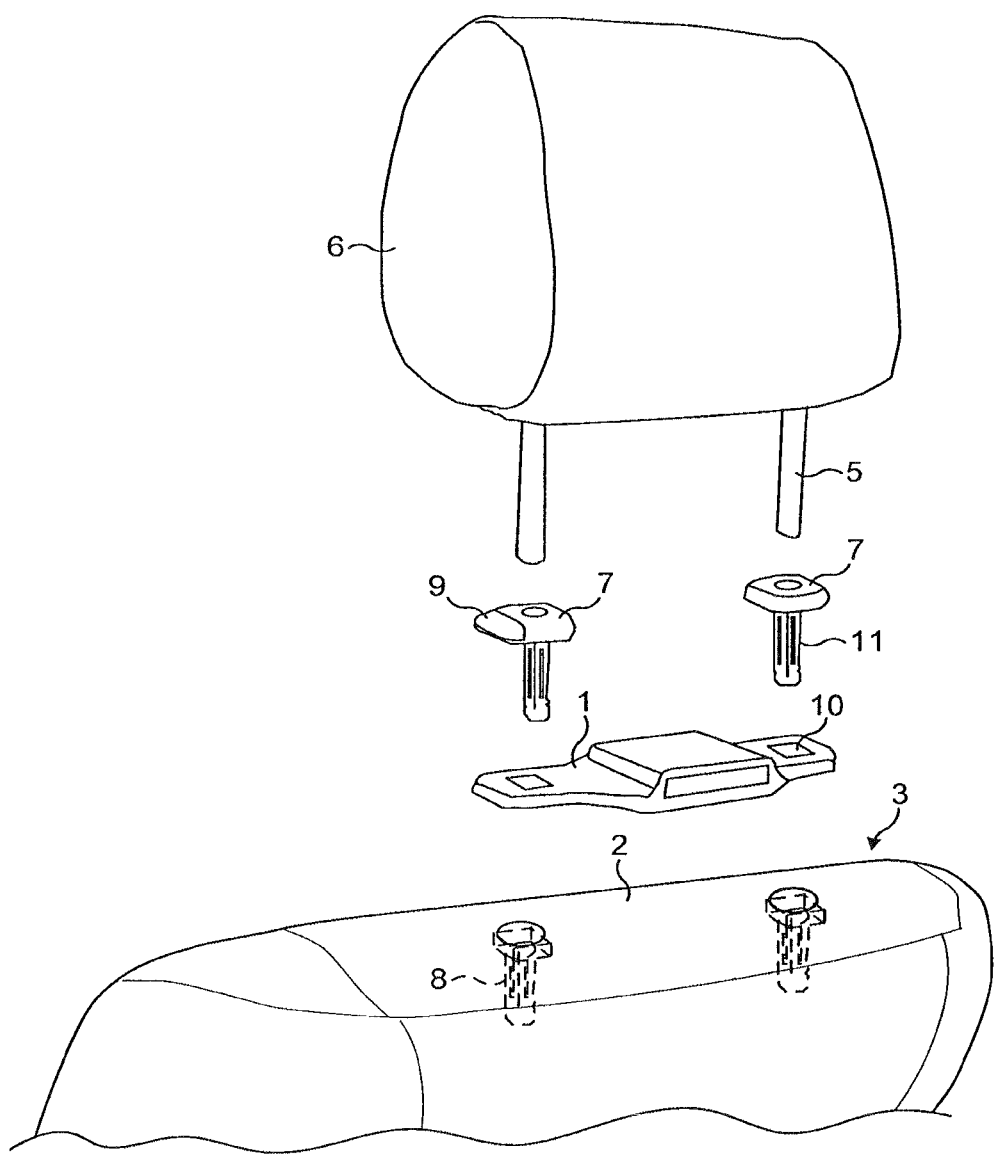
FIG. 2 shows the arrangement of FIG. 1 in an exploded perspective view.
Figure 3:
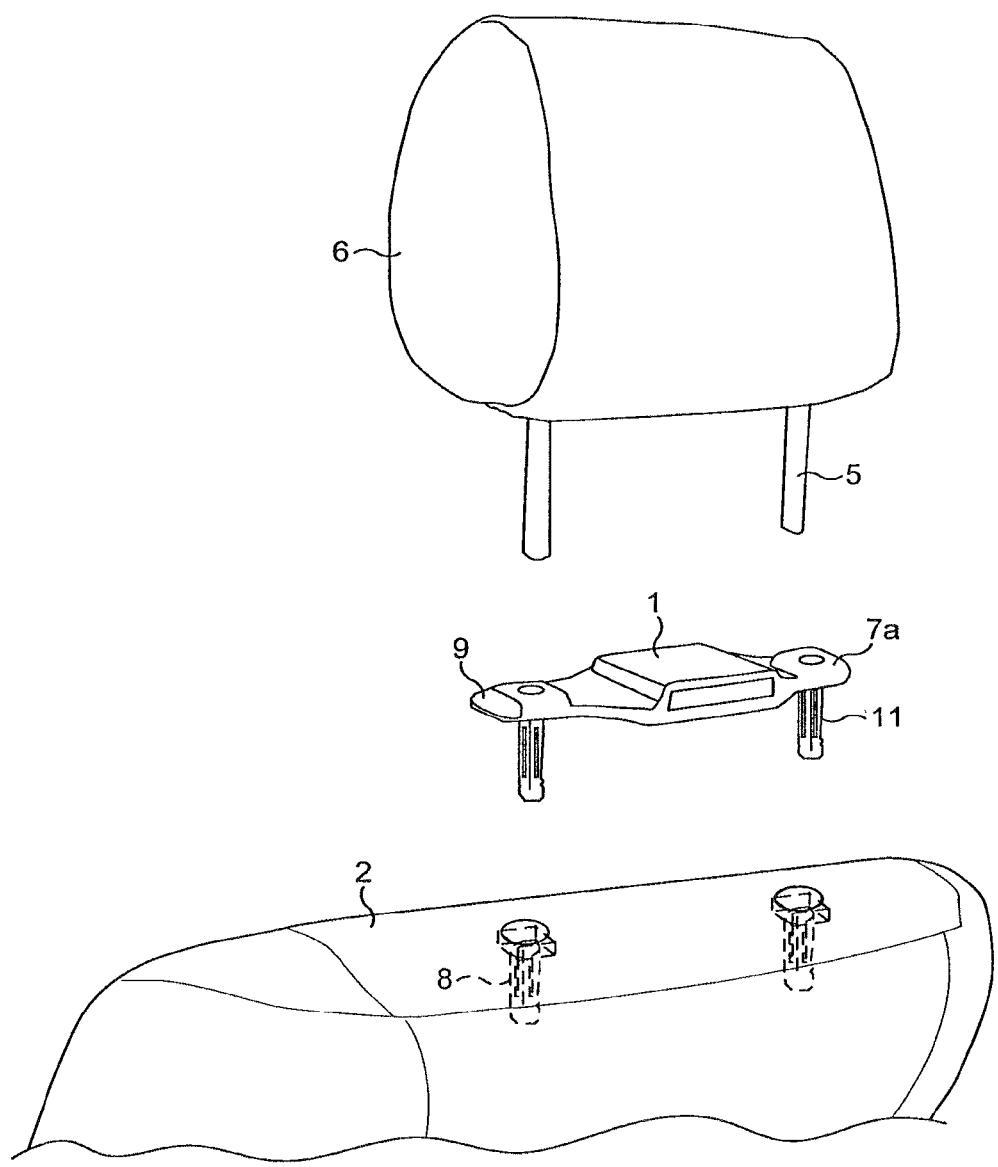
FIG. 3 is a view similar to FIG. 2 showing an alternative embodiment.

Referring first to FIGS. 1 to 3 of the accompanying drawings, a console 1 is mounted to the top 2 of a seat back 3 of a front seat of a vehicle. Wiring 4 hidden within the seat back 3 provides power to the console 1. As can be seen from FIG. 1, console 1 is mounted about posts 5 for a headrest 6, the height of which is adjustable.

DESCRIPTION OF PREFERRED EMBODIMENTS

In conventional fashion, headrest 6 has associated headrest retaining clips 7 which serve to lock the position of its posts 5 within corresponding sockets 8 (see FIG. 2) formed in the seat top 2. The headrest 6 is adjustable in height above the seat top 2, the headrest retaining clips 7 including respective lock release buttons 9 which, when pressed, allow the post to be raised or lowered and, when released, lock the post in position.

The present disclosure contemplates two basic alternative structures which essentially rely upon the same concept. In the FIG. 2 arrangement, console 1 is effectively sandwiched between headrest retaining clips 7 and top 2 of the seat back 3. In the FIG. 3 arrangement, the respective headrest retaining clips are incorporated into the structure of the console itself. In either case, the headrest clips function in conventional fashion, as illustrated below in FIGS. 4 and 5 for the FIG. 3 embodiment.

With the FIG. 2 arrangement, wiring (not shown) may be provided for its power supply through the seat back. The headrest is removed and the console 1, which has through openings 10, is positioned so that shafts 11 of the respective conventional headrest clips 7 provided as an element of the seat may be inserted through the through openings 10 and into the sockets 8. The posts 5 are then inserted into sockets 8 through shafts 11 in conventional fashion.

In the alternative arrangement of FIG. 3, the original headrest clips are discarded and headrest clips 7a, formed as an integral component of the console 1, but otherwise identical to headrest clips 7, are used instead and serve the identical purpose.

Figure 4:
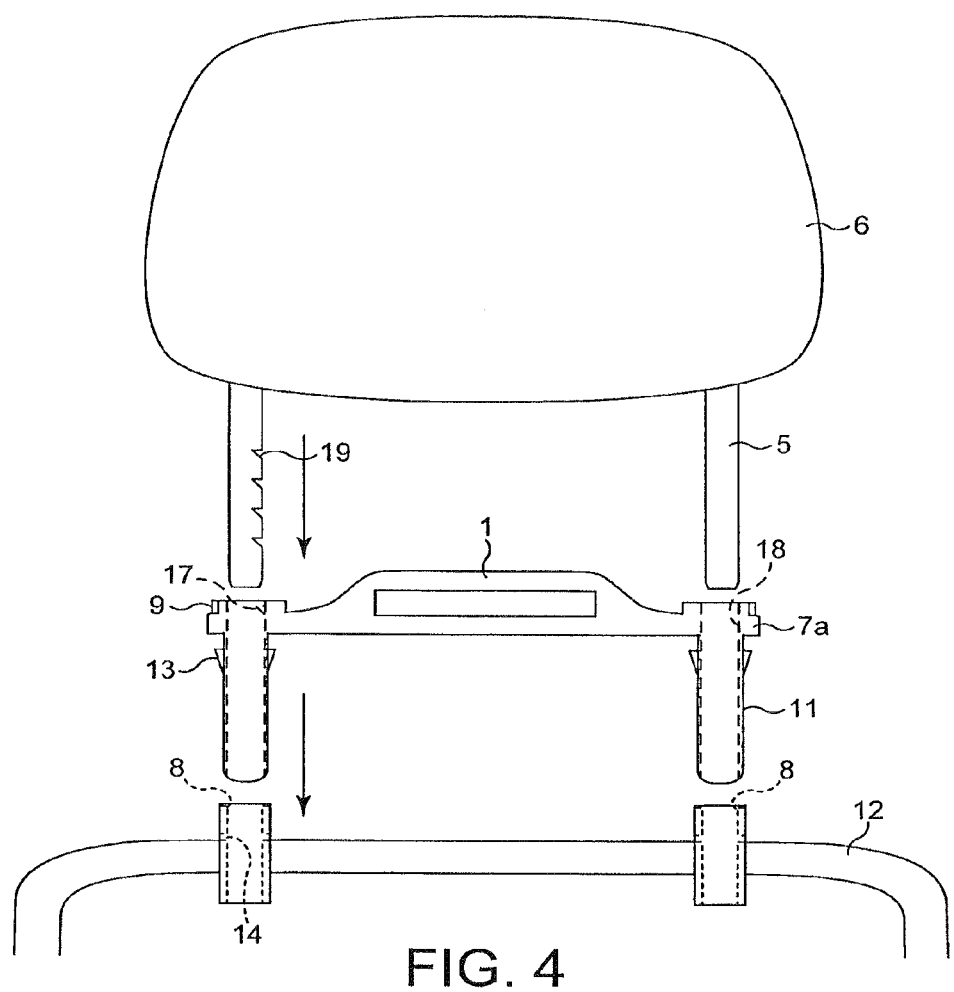
FIG. 4 is a rear elevational view showing how the headrest, console and portions of the vehicle seat co-operate for the embodiment of FIG. 3.
Figure 5:
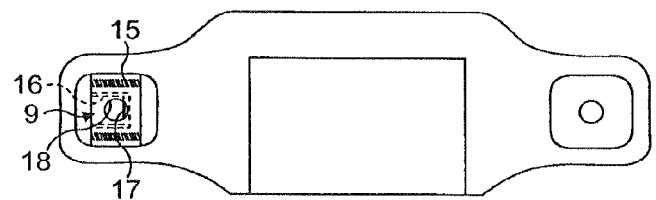
FIG. 5 is a top plan view of the console illustrated in FIG. 4.

FIGS. 4 and 5 show in more detail how the headrest clips (in this case integrated into the console 1) serve to anchor both the console and the headrest posts in sockets within the seat back. For convenience and economy of drawing, the detailed structure is illustrated in these Figures for one only of the headrest posts 5. It should be understood that in general the same details will be repeated for the other headrest post.

Hollow sockets 8 are fixedly mounted to internal support structure 12 within a seat back. The headrest clips 7a incorporated into console 1 in this embodiment include integral shafts 11 which are of hollow tubular form, as indicated by the dotted lines shown in FIG. 4, to allow reception of headrest posts 5 therethrough. Externally, shafts 11 are provided with barbs or "sharkfin" shaped locking members 13 adapted to co-operate with detents or apertures 14 within sockets 8 to hold the console in place within the sockets 8. Headrest posts 5 may then be inserted into the tubular shafts 11. In order to allow this, respective lock release buttons 9 must be pressed. These buttons are biased outwardly by springs 15, and have a central opening 16, an edge 17 of which occludes through opening 18 provided in shaft 11 for the post 5 unless lock release button 9 is pressed. With shafts 11 inserted into sockets 8 and lock release button 9 pressed, the corresponding headrest post 5 may be inserted into the through opening 18. Release of lock release button 9 causes edge 17 to engage with one of a series of cut-outs 19 formed in the side of the respective post 5 locking the whole arrangement in place. The height of headrest 6 can still readily be adjusted by pressing the lock release buttons 9 and moving the headrest up or down, but meanwhile console 1 is held in place on the top of the seat back and, as can be seen from FIG. 1 is relatively inconspicuous.

The details of the headrest clip and of its co-operation with the seat back socket 8 and with the headrest post 5, as described and illustrated above is conventional. This conventional structure is integrated into the structure of the console in the arrangement illustrated in FIGS. 4 and 5. The conventional headrest clips would be employed in the embodiment of FIG. 2. Having withdrawn the headrest posts from through openings 18 in shafts 11, the headrest clips 7 (FIG. 2 embodiment) may be removed to insert or release console 1 by pressing on the sides of shaft 11 to release barbs 13 from detents or apertures 14 in sockets 8. Similarly, in the embodiment of FIGS. 3, 4 and 5, the console with its integral headrest clips 7a is released from sockets 8 by squeezing the sides of shafts 11 to release barbs 13 from detents 14.

Figure 6:
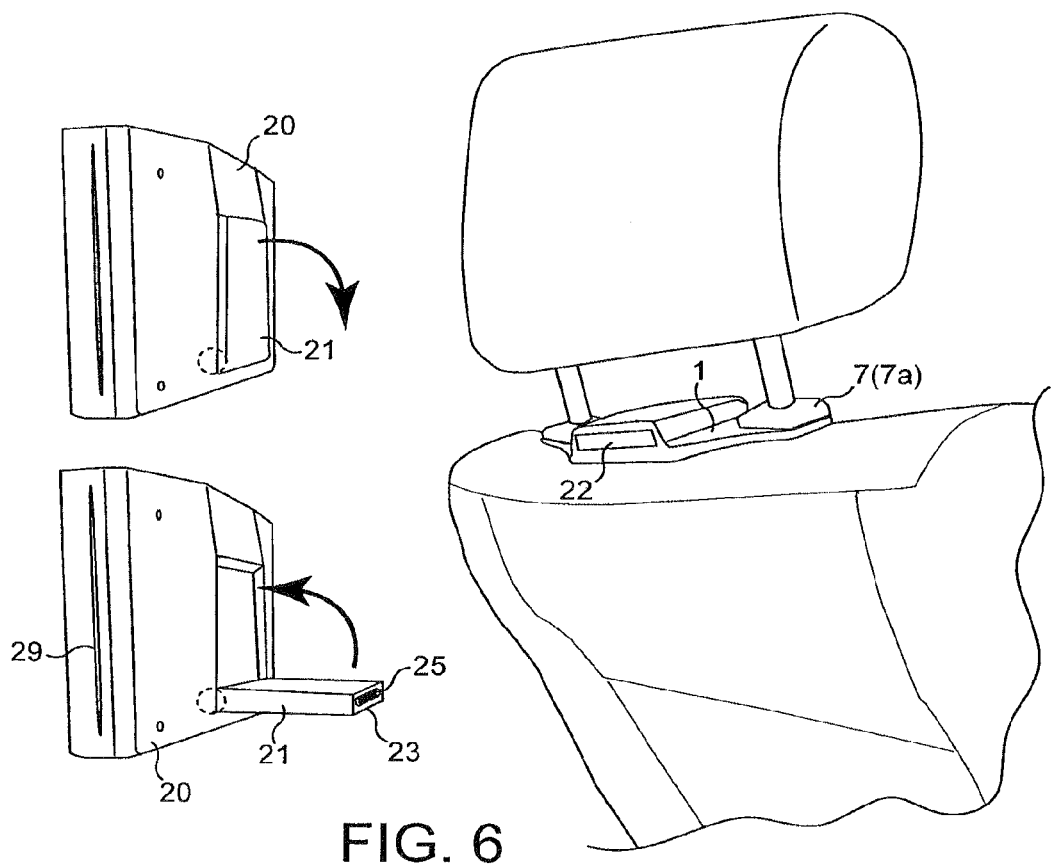
FIG. 6 is a perspective view illustrating how an embodiment of audio/visual apparatus co-operates with a console in the embodiments of FIG. 2 or 3.
Figure 7:
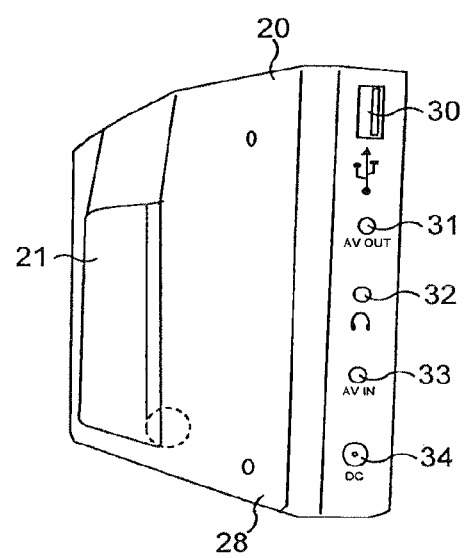
FIG. 7 is a perspective view of the audio/visual apparatus shown in FIG. 6 from the opposite side.
Figure 8:
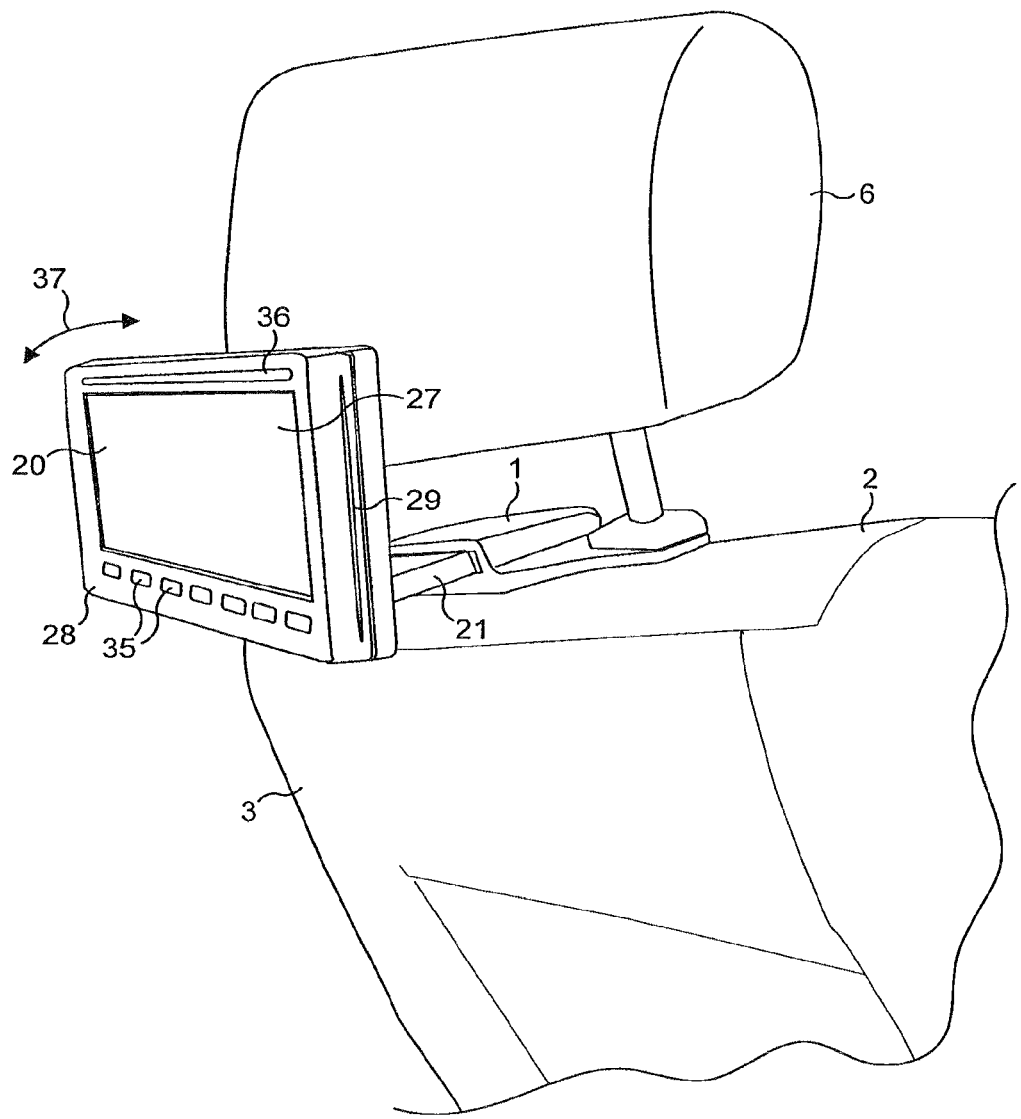
FIG. 8 shows the audio/visual apparatus being offered up to a console.
Figure 9:
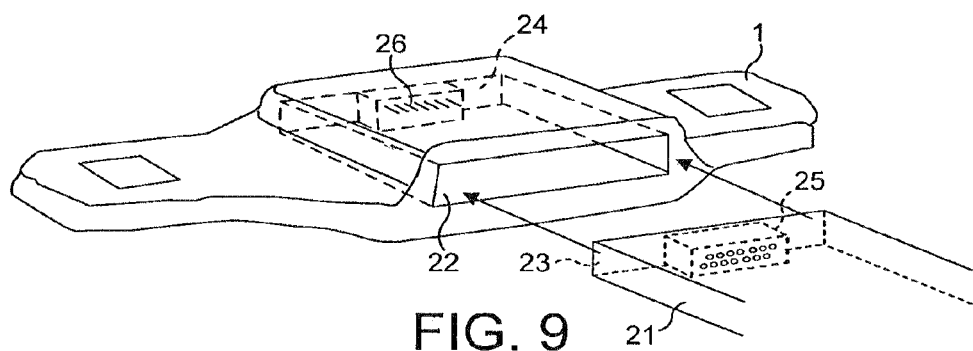
FIG. 9 is a somewhat schematic perspective view illustrating a first mode of electrical interconnection between the audio/visual apparatus and the console.
Figure 10:
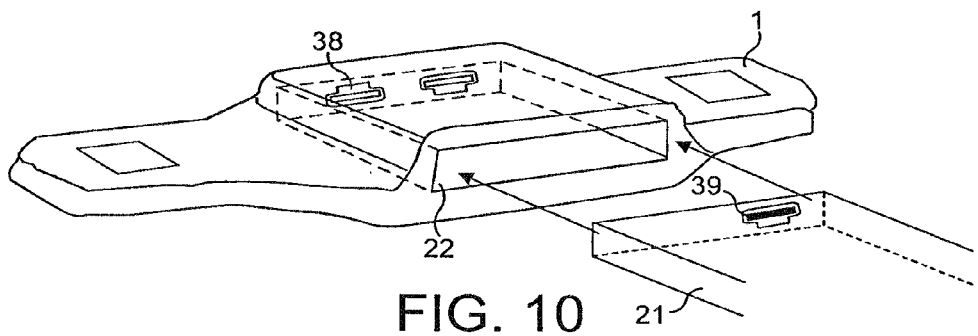
FIG. 10 is a view similar to FIG. 9 for a second alternative mode of interconnection.
Figure 11:
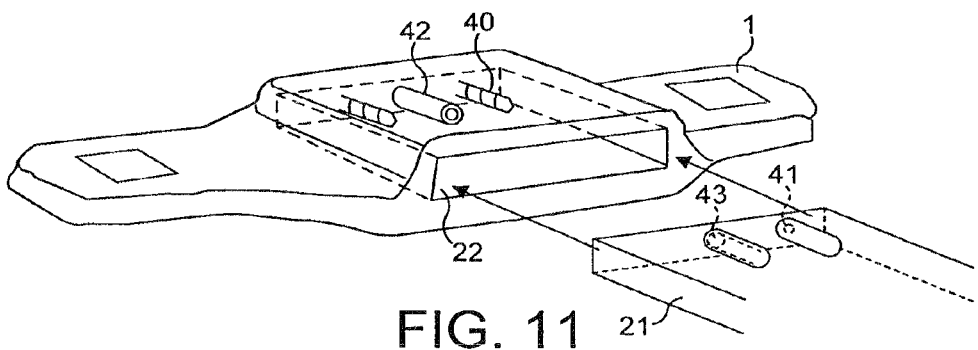
FIG. 11 is a view similar to FIGS. 9 and 10 for a third alternative mode of interconnection.

Having fitted a console to the seat back either sandwiched between headrest clips and the seat top or by employing headrest clips integral with the console, an audio/visual apparatus 20 (see FIGS. 6, 7 and 8) may now be fitted to console 1. In the arrangement illustrated in these Figures, audio/visual apparatus 20 incorporates a hingedly mounted coupling member 21 adapted to be received within a correspondingly shaped slot 22 provided in the console 1. Distal end 23 of coupling member 21 and an internal rear wall 24 (FIGS. 9, 10 and 11) of the slot 22 have interfitting connections. These may take various forms as explained in more detail below. FIG. 6 shows multiple sockets 25 adapted to interfit with multiple pins 26 (FIGS. 9 and 12a to 12c).

Audio/visual apparatus 20 incorporates a screen 27, suitably a LCD panel display within a casing 28, which may also include a DVD loader slot 29, a USB socket 30, an AV output socket 31 for playing to an external monitor, a headphone socket 32, an AV input socket 33 for playing from an external source, and a DC input socket 34 allowing the apparatus to be powered from a suitable source of direct current, such as a battery powerpack or from the cigar lighter sockets in a vehicle, if wiring through the seat back is not provided, or when the audio/visual apparatus 20 is removed from console 1 for use elsewhere. Casing 28 also has a series of control buttons 35. In preferred embodiments, it may also have a lens or lenses 36 for infra-red audio transmission to headphones that may be linked to the apparatus by infra-red, an infra-red remote receiver for remote control of functions of apparatus 20, and a light dependent resistor for auto dimming of backlight in apparatus depending on ambient light level. Additional sockets may be provided for an aerial connection, if not provided through the seat back wiring, and for coupling of one or more games controllers to the apparatus 20. The angle of screen 27 may be adjusted for best visibility by a user by pivoting casing 28 relative to coupling member 21, as indicated by arrows 37 in FIG. 8.

A suitable DVD loader is available under the designation RL-C500 from Raymedia Co Ltd and a nominal 7" LCD panel suitably sized for seatback entertainment apparatus is available under the designation PW070XS1 from PVI Optronics.

It will be readily appreciated by persons skilled in this field that many different configurations for the audio/visual entertainment unit 20 will be feasible such as: an LCD screen with integrated DVD, an LCD screen with integrated hard disc drive (HDD) player for example available from USB Gear Ltd under the designation USBG-AIVX, an LCD screen alone for use with external sources, an LCD screen with integrated TV tuner (for example that available from Pioneer under the trade designation GEX-500DVB), an LCD screen with integrated multiple memory card reader, an LCD screen with integrated GSM card reader, an LCD screen with integrated GPS receiver, and an LCD screen with integrated wireless LAN receiver. Depending on space and miniaturisation, various combinations of the above would be feasible and depending upon the particular combinations sought, an appropriate printed circuit board (PCB) to run the system could readily be provided.

We have found that the multiple pin and socket arrangement of FIGS. 6, 9 and 12a to 12c works well. A typical pin configuration would be: [0050] 1. Power +12 Volts [0051] 2. Ground [0052] 3. Video signal [0053] 4. Video ground [0054] 5. Audio left [0055] 6. Audio right [0056] 7. Audio ground

[0057] 8. Inverse status (provides a signal to automatically switch orientation of the picture when audio/visual apparatus 20 is presented to slot 22 upside-down)

However, other arrangements are also feasible as illustrated schematically in FIGS. 10, 11 and 13 to 17. Thus, in FIG. 11, the multiple pin and socket connectors are replaced by co-operating HDMI connectors 38 and 39. In another alternative shown in FIG. 11, respective 3.5 mm jack plugs 40 and sockets 41 may be provided, together with a centrally mounted DC jack 42 and socket 43.

Figure 12A:
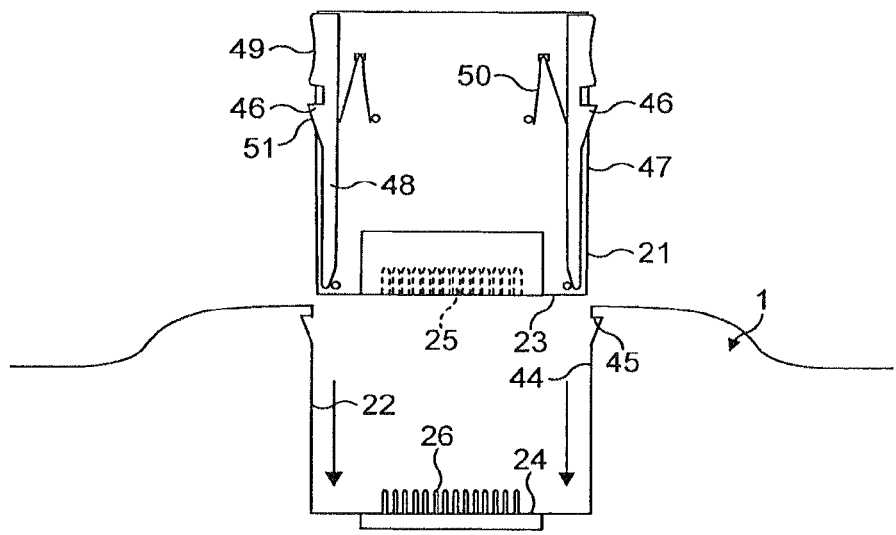
FIGS. 12a, 12b and 12c are schematic views showing internal structure within a coupling member of an audio/visual apparatus showing how it cooperates with a console.
Figure 12B:
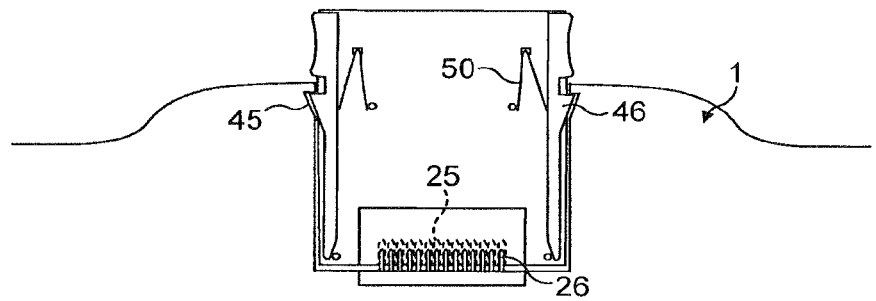
Figure 12C:
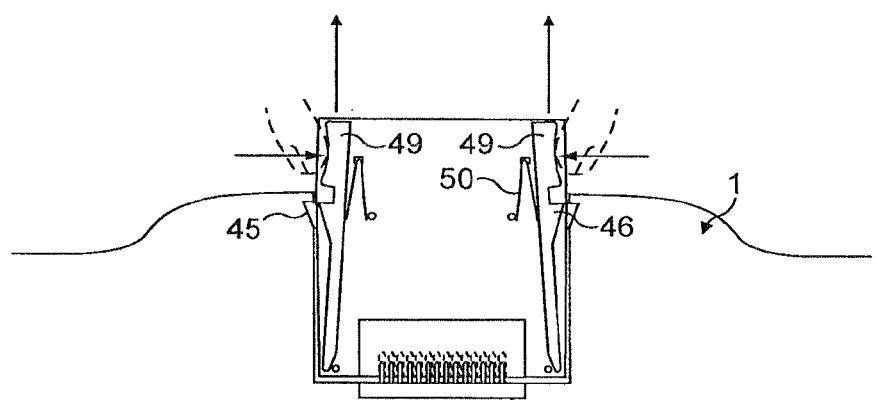

Turning now to FIGS. 12a, 12b and 12c which illustrate for the multiple pin and socket arrangement how the coupling member 21 associated with the audio/visual apparatus 20 and slot 22 in console 1 co-operate to hold the apparatus 20 releasably but firmly in position.

Side walls 44 of slot 22 have detents or locking apertures 45 adapted for receiving spring loaded locking clips 46 in side edges 47 of coupling member 21. Within each said side edge 47 is mounted an elongate tongue 48 formed with a finger press portion 49 and a said locking clip 46, the finger press portion and the locking clip extending outwardly of side edge 47 through respective openings therein, being biased outwardly by a spring 50. As the distal end 23 of coupling member 21 is offered up (FIG. 12a) to slot 22, a ramp edge 51 of each locking clip 46 cams over the edge of slot 22 until the respective detent 45 is reached at which point spring 50 pushes tongue 48 outwardly to lock clip 46 with detent 45. At the same time the respective multiple sockets 25 in the distal end 23 of coupling member 21 mate with the corresponding multiple pins 26 in internal rear wall 24 of slot 22 (FIG. 12b). In order to release coupling member 21 from slot 22 (and thus the audio/visual apparatus 20 as a whole from console 1), pressure is applied to finger press portions 49, as indicated by dotted lines in FIG. 12c, against the bias of springs 50 to release clips 46 from detents 45, whereupon the coupling member 21 may be withdrawn from slot 22. It will be understood that similar spring loaded locking clips and detents may be provided in the arrangements of FIGS. 10 and 11.

Figure 13:
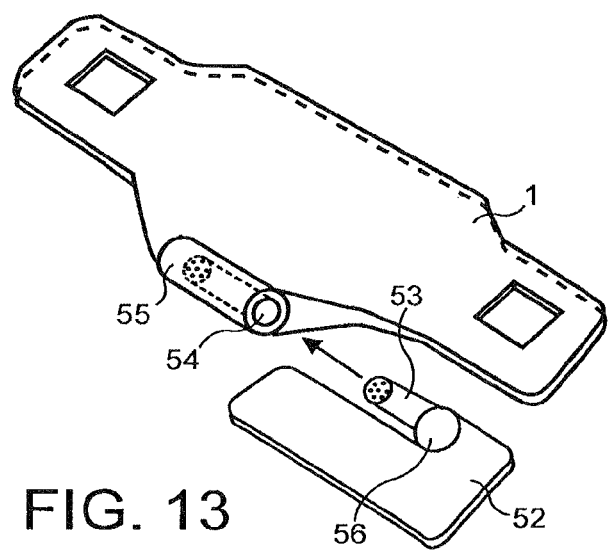
FIG. 13 is a perspective view of a console and rear fitting for an audio/visual apparatus in an alternative embodiment.
Figure 14:
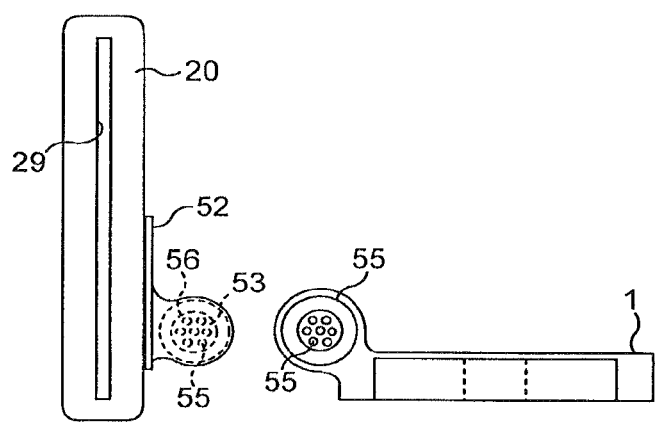
FIG. 14 is a side elevational view of the console of FIG. 13 and rear fitting of FIG. 13 shown fitted to an audio/visual apparatus.
Figure 15:
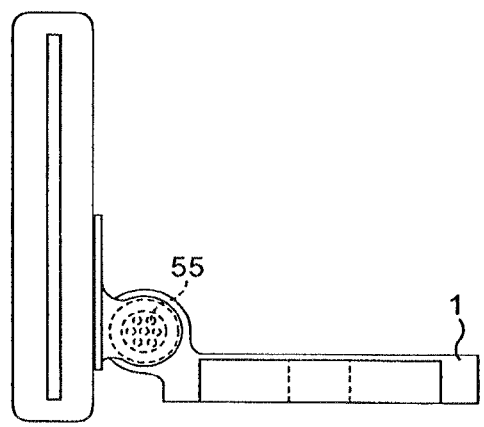
FIG. 15 is a view similar to FIG. 14 with the parts coupled together.
Figure 16:
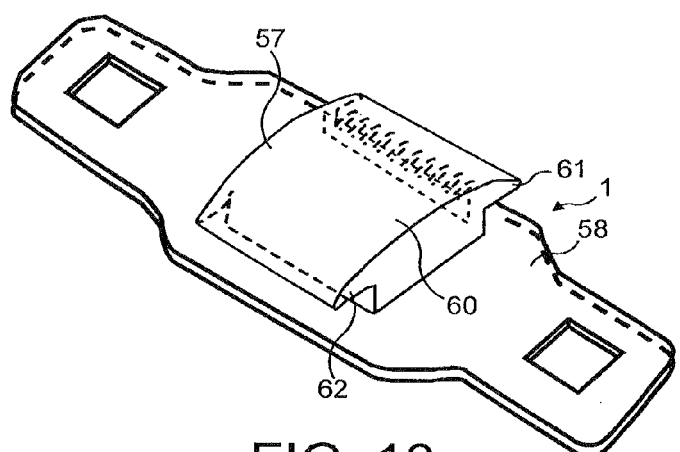
FIG. 16 is a perspective view of an alternative embodiment of console.
Figure 17:
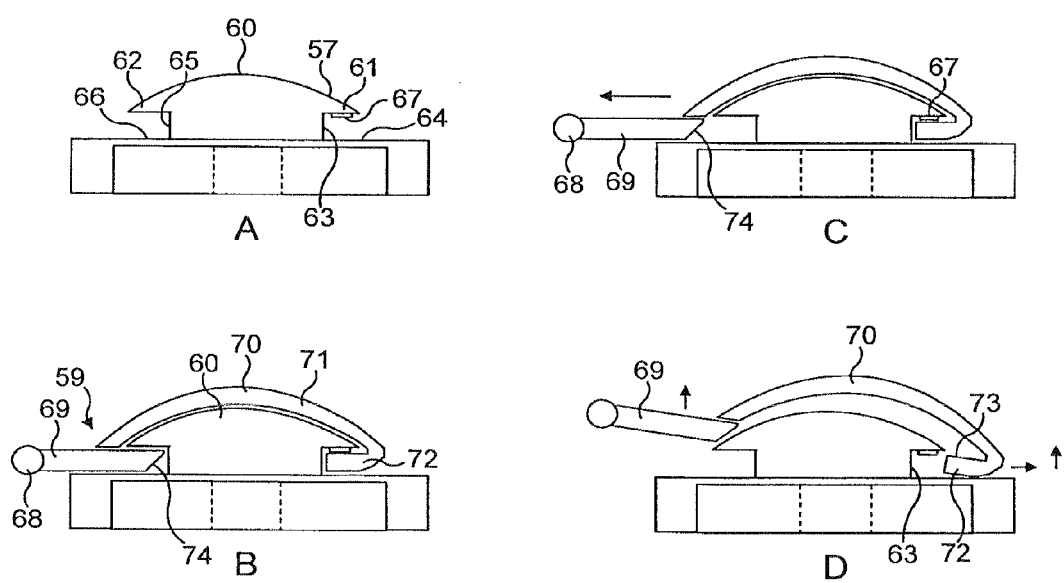
FIGS. 17a to 17d schematically illustrate successive stages in interconnection of a coupling structure associated with an audio/visual apparatus with the console of FIG. 16.

FIGS. 13 to 15 illustrate an alternative approach to coupling between an audio/visual apparatus 20 and console 1. In this arrangement audio/visual apparatus 20 has a rear member 52 including a cylindrical member 53 which is adapted to fit into a corresponding socket 54 provided in a rearwardly extending boss 55 on console 1. One of cylindrical member 53 and socket 54 is provided with pins and the other is provided with sockets so that a multiple pin and socket arrangement 55 provides for electrical interconnection. In the preferred arrangement for this embodiment, the pins and sockets are adapted for interconnection in only one orientation. To allow for adjustment in the angular position of the audio/visual apparatus 20, cylindrical member 53 may be connected to the remainder of rear member by a rotatable joint 56 coaxial with cylindrical member 53.

Yet another approach to interconnection between audio/visual apparatus 20 and console 1 is illustrated in FIGS. 16 and 17a to 17d. In this embodiment, console 1, rather than having a housing defining a slot 22 for receipt of a coupling member 21 adapted to fit within the slot, as in the embodiments of FIGS. 1 to 12, has a generally mushroom shaped coupling structure 57 on its upper surface 58 adapted for coupling with a co-operating coupling structure 59 associated with the audio/visual apparatus 20. Mushroom structure 57 effectively comprises a domed head 60 with overhangs 61 and 62 on its opposite sides. Overhang 61 defines a slot 63 between the overhang and confronting surface 64 of the remainder of the console. Similarly, overhang 62 effectively defines a slot 65 between the overhang and the confronting surface 66 of the remainder of the console. The undersurface of overhang 61 includes a plurality of electrical contacts 67 (FIG. 17a). Coupling structure 59 associated with the remainder of the audio/visual apparatus (not shown in these Figures) includes a hinge 68 providing the connection to the audio/visual apparatus, a plate 69 and a hook shaped member 70 possessing a degree of flexibility and being slidably coupled to the plate 69. Hook member 70 includes a curved portion 71, generally corresponding in shape and extent with the external shape of domed head 60, and a return hooked portion 72 at its end. In order to couple structure 59 to the mushroom coupling structure 57, hook member 70 is placed over the domed head 60 and return hooked portion 72 is hooked under overhang 61. The thickness of return hooked portion 72 is chosen so that it forms a tight fit within slot 63 so that a plurality of contacts 73 formed on the surface of the return hooked portion 72 make electrical connection with the respective contacts 67 on the underside of overhang 61. With member 70 hooked over domed head 60, the plate 69 is slidably moved relative to hook member 70 so that its end portion 74 is received in slot 65. The thickness of plate 69 is chosen so that plate 69 forms a tight fit within slot 65. In this configuration (FIG. 17c), the audio/visual apparatus hingedly connected to hinge 68 is sufficiently rigidly held in place. The audio/visual apparatus may readily be disconnected from this embodiment of console illustrated in FIGS. 16 and 17a to 17d by slidably withdrawing plate 69 from slot 65 (FIG. 17c) and then pushing plate 69 upwardly (as shown by the arrow in FIG. 17d) and over domed head 60 to disengage return hooked portion 72 of hook member 70 from its slot 63.

Figure 18:
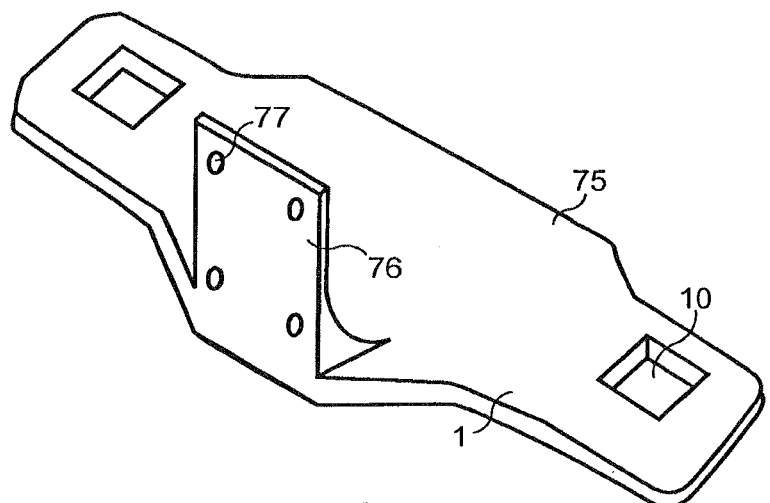
FIG. 18 is a perspective view of an alternative embodiment of console/bracket.
Figure 19:
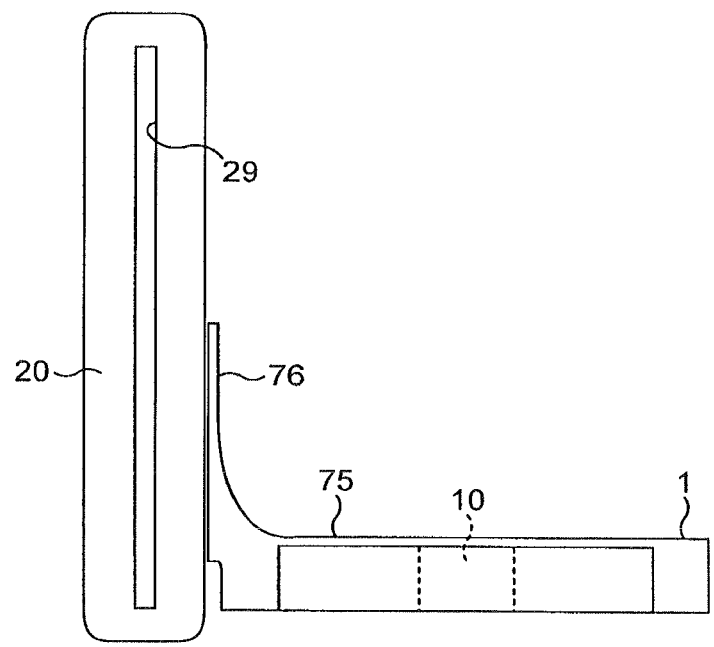
FIG. 19 is a side elevational view of the console/bracket of FIG. 18 fitted to an audio/visual apparatus.

While very much less preferred, as it may leave the audio/visual apparatus 20 exposed for view in a vehicle, inviting breaking, entering, damage and theft thereof when the vehicle is unoccupied, the audio/visual apparatus 20 may be permanently connected to console 1 which then effectively acts as a bracket. This arrangement is illustrated in FIGS. 18 and 19. Here console/bracket 1 comprises a generally flat-topped member 75 with the through openings 10 for the headrest posts and an upstanding flange 76 apertured at 77 for fixing members such as screws for coupling flange 76 to back 77 of audio/visual apparatus 20. It will be understood that this console/bracket 1, as with the all of the embodiments described above is reliably mounted in position by the conventional headrest clips that serve to hold the headrest at the desired height, or in the alternative variation by headrest clips integrated into console/bracket 1 itself.

The embodiment of FIGS. 18 and 19 has no provision for electrical connection via the console/bracket 1 to the audio/visual apparatus 20. Instead, that apparatus must be powered via a power input such as DC input 32 (FIG. 34) from the vehicle cigar lighter socket or a similar power supply.

Where desired, the embodiments of FIGS. 2 and 3 may be adapted to provide permanent fitting of an audio/visual apparatus 20 to a console 1. The audio/visual apparatus 20 may have its coupling member permanently bonded into slot 22. Other arrangements for permanent fixing an audio/visual apparatus to a console or for integrating such apparatus with a console will readily suggest themselves to a person of ordinary skills, all, however, utilising the conventional headrest retaining clips or incorporating headrest retaining clips into the console itself, in the manner described above.

Figure 20:
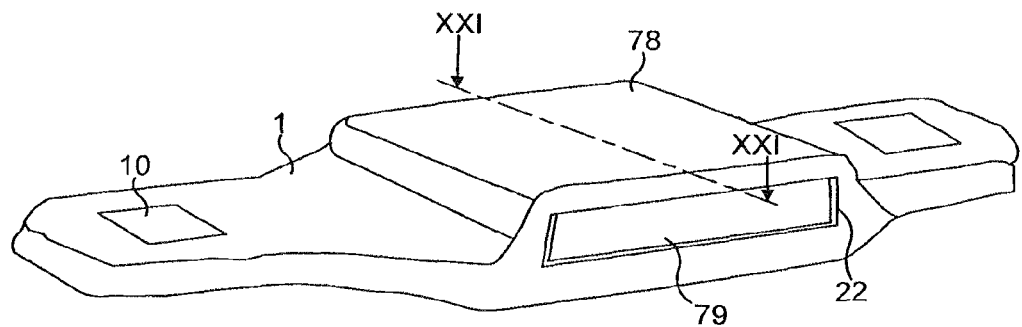
FIG. 20 a perspective view of a console.
Figure 21:
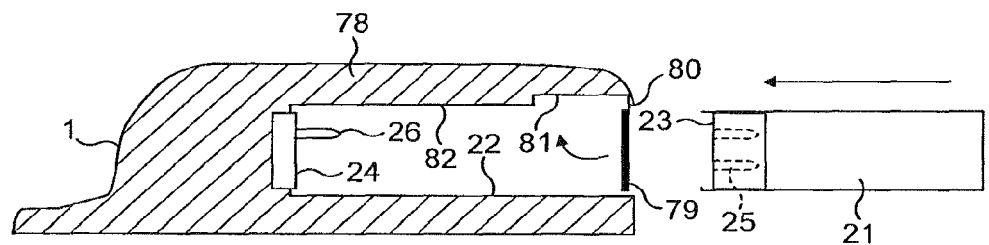
FIG. 21 is a sectional view of the console of FIG. 20 taken along the line XXI-XXI, illustrating a coupling member being offered up to its slot.
Figure 22:
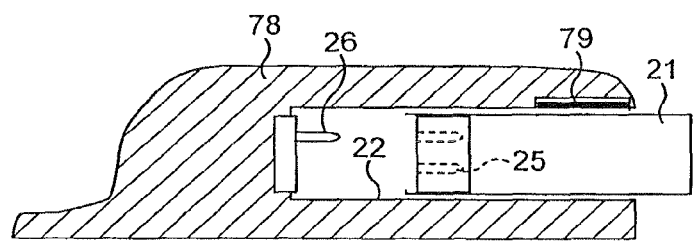
FIG. 22 is a view similar to FIG. 21 at a subsequent stage in offering up the coupling member.

Of all the coupling arrangements described and illustrated herein, our preferred arrangement at the date of filing this Application, is the use of a console 1 that includes a housing 78 providing a slot 22 for receipt of a coupling member 21 associated with the audio/visual apparatus 20 and with electrical connection being provided between co-operating couplings at distal end 23 of coupling member 21 and in the internal rear wall 24 of slot 22. In the preferred arrangement, slot 22 is provided with a protective door 79, as shown in FIGS. 20, 21 and 22. Door 79 is hingedly connected to housing 78 of console 1 along upper edge 80 of slot 22 at its mouth, so that gravity (with optional assistance of a spring—not shown) causes door 78 to hang across the open mouth of slot 22 to prevent entry of foreign matter. As the distal end 23 of coupling member 21 is offered up to the mouth of slot 22 (FIG. 21), door 79 is pushed out of the way, against the bias of its spring if provided, and into a recess 81 in upper surface 82 of slot 22 adjacent edge 80, as shown in FIG. 22.

Figure 23:
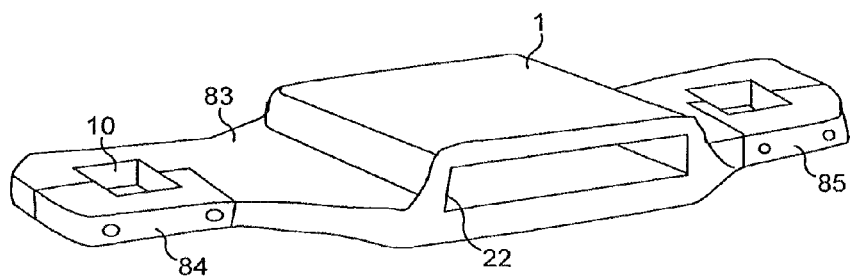
FIG. 23 is a perspective view of an alternative embodiment of console.
Figure 24:
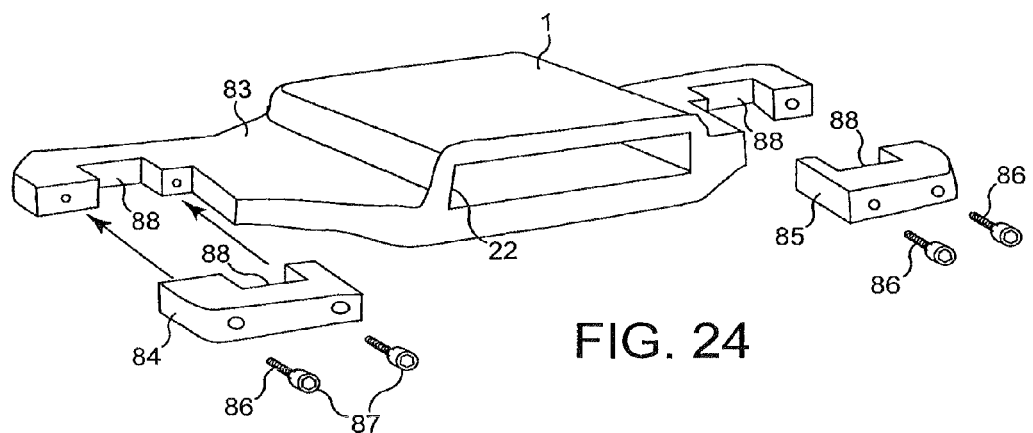
FIG. 24 is an exploded perspective view of the console of FIG. 23.

In all the embodiments illustrated above in which console 1 has through openings 10, in order to fit the console, the headrest 6 and headrest clips 7 must be completely removed from the seat back, the console then being positioned, the shafts 11 of the headrest clips inserted through openings 10 and into sockets 8. Only then may the headrest posts be replaced. The arrangement illustrated in FIGS. 23 and 24 avoids the need for this. As can be seen from these Figures, console 1 is here shown as formed in three portions, namely a main portion 83 and two auxiliary portions 84 and 85 which are detachably coupled to the main portion by threaded members 86 here shown with a head 87 formed with an hexagonal recess for receipt of an Allen key in order to tighten or untighten the threaded member 86. The main portion 83 and/or the auxiliary portions 84 and 85 are notched, as best shown at 88 in FIG. 24, to define cut-outs. As can be seen from FIG. 23, the respective cut-outs mate in effect to define the through openings 10. Thus, the embodiment of console 1 shown in FIGS. 23 and 24 may be fitted to a vehicle seat without first removing the headrest and headrest clips. The headrest and the respective headrest clips first need to be raised. Main portion 83 is slid into place between the raised headrest clips and the top of the seat back. Auxiliary portions 84 are then coupled to main portion 83 by the threaded members 86 so that the console 1 effectively embraces each of the headrest posts 5. The height of the headrest is then adjusted and headrest clips lowered and then locked to the headrest posts so as to sandwich console 1 between the headrest clips and the seat top.

In an alternative arrangement, the console may effectively be built into the seat during manufacture.

Referring again to FIG. 4, sockets 8 are fixedly mounted to internal seat support structure 12, for example by welding. Then, either before or during the application of the padding, upholstery, etc to build up the complete seat back, console 1 is fitted to sockets 8 by inserting shafts 11 therein until the barbs 13 locate in detents or apertures 14 to fix the console to the sockets 8, and thus to the internal seat structure 12. The console, apart from the headrest clip portions thereof and the slot 22, may then be covered in the seat padding and upholstery. In FIG. 4, the console 1 is shown with a central raised portion in which the slot is located. To make it easier to incorporate the console into the seat material, as described above, the geometry of the central portion of the console may be reversed, with a bulged portion in which the slot is located being below the level of the headrest clips rather than above, as shown in FIG. 4.

What is claimed:
1. An apparatus, comprising:
   a console adapted for mounting an entertainment apparatus for use by a vehicle passenger, wherein a seat is fitted with a headrest mounted on posts;
   the console having a pair of openings with sides surrounding a portion of the posts, wherein a dimension of each of the openings is adjustable; and a coupling structure protruded from the console, wherein the entertainment apparatus is coupled with the coupling structure via a coupling member, wherein the coupling structure includes a compartment having an opening extending lengthwise between the pair of openings, the compartment shaped and dimensioned to receive the coupling member, the compartment enclosed on all sides expect for one side which exposes the compartment through the opening prior to the coupling member being received in the compartment, wherein a top side of the compartment directly contacts a bottom side of the headrest and a bottom side of the compartment directly contacts a top side of the seat when the compartment is sandwiched between the headrest and the seat, and wherein a back side of the compartment is disposed near a front side of the seat and the opening of the compartment is disposed near a back side of the seat.

2. The apparatus of claim 1, wherein the posts are embraced by the sides of the pair of openings.

3. The apparatus of claim 1, wherein the console is sandwiched between the headrest and the seat.

4. The apparatus of claim 1, wherein the coupling structure includes contacts and the coupling member includes cooperating contacts for mating with the contacts of the coupling structure.

5. The apparatus of claim 1, wherein the console includes at least one adjustment mechanism for adjusting the dimensions of the openings.

6. The apparatus of claim 5, wherein the adjustment mechanism is rotatable.

7. The apparatus of claim 1, wherein the angular position of the entertainment apparatus is adjustable.

8. An apparatus comprising:
a console having first and second attaching portions configured to attach the console to a top portion of a seat and a coupling structure protruded from between the first and second attaching portions, wherein the first and second attaching portions include openings with sides configured to surround a portion of posts of a headrest of the seat, wherein a dimension of each of the openings is adjustable, wherein the coupling structure includes a compartment shaped and dimensioned to receive a coupling member connectable to an entertainment apparatus, the compartment enclosed on all sides expect for one side which includes an opening, wherein a top side of the compartment directly contacts a bottom side of the headrest and a bottom side of the compartment directly contacts a top side of the seat when the compartment is sandwiched between the headrest and the seat, and wherein a back side of the compartment is disposed near a front side of the seat and the opening of the compartment is disposed near a back side of the seat.

9. The apparatus of claim 8, wherein the console is configured to mount the entertainment apparatus for use by a vehicle passenger.

10. The apparatus of claim 9, wherein the entertainment apparatus has a front portion and a back portion, a display is disposed on the front portion and the coupling member is disposed on the back portion.

11. The apparatus of claim 9, wherein the angular position of the entertainment apparatus is adjustable.

12. The apparatus of claim 8, wherein the posts of the headrest are embraced by the sides of the pair of openings.

13. The apparatus of claim 8, wherein the console includes at least one adjustment mechanism for adjusting the dimensions of the openings.

14. The apparatus of claim 13, wherein the adjustment mechanism is rotatable.

* * * * *